United States Patent
Ono et al.

(10) Patent No.: US 9,523,483 B2
(45) Date of Patent: Dec. 20, 2016

(54) LIGHT IRRADIATION DEVICE, BACKLIGHT DEVICE AND DISPLAY APPARATUS

(71) Applicants: OG CORPORATION, Osaka-shi, Osaka (JP); T. CHATANI & CO., LTD., Osaka-shi, Osaka (JP)

(72) Inventors: Kouji Ono, Tokyo (JP); Takeshi Sumi, Osaka (JP)

(73) Assignees: OG Corporation, Osaka-shi, Osaka (JP); T. Chatani & Co., Ltd., Osaka-shi, Osaka (JP)

( * ) Notice: Subject to any disclaimer, the term of this patent is extended or adjusted under 35 U.S.C. 154(b) by 4 days.

(21) Appl. No.: 14/426,045

(22) PCT Filed: Sep. 2, 2013

(86) PCT No.: PCT/JP2013/073497
§ 371 (c)(1),
(2) Date: Mar. 4, 2015

(87) PCT Pub. No.: WO2014/038502
PCT Pub. Date: Mar. 13, 2014

(65) Prior Publication Data
US 2015/0226408 A1 Aug. 13, 2015

(30) Foreign Application Priority Data
Sep. 4, 2012 (JP) ................................. 2012-194307

(51) Int. Cl.
*F21V 7/04* (2006.01)
*F21V 19/00* (2006.01)
(Continued)

(52) U.S. Cl.
CPC ............. *F21V 19/002* (2013.01); *G02B 6/009* (2013.01); *G02B 6/0073* (2013.01);
(Continued)

(58) Field of Classification Search
CPC  F21V 19/0015; F21V 19/0025; F21V 19/002; G02B 6/0073; G02B 6/009; G02B 6/0068; G02B 2001/133628; F21Y 2101/02
See application file for complete search history.

(56) References Cited

U.S. PATENT DOCUMENTS

| | | | | |
|---|---|---|---|---|
| 7,736,016 B2 * | 6/2010 | Suehiro et al. | ............... | 362/218 |
| 2008/0284308 A1 * | 11/2008 | Pang | ............... | 313/498 |
| 2009/0086507 A1 * | 4/2009 | Iwasaki | ............... | 362/613 |

FOREIGN PATENT DOCUMENTS

| | | |
|---|---|---|
| CN | 1612020 A | 5/2005 |
| CN | 101546063 A | 9/2009 |

(Continued)

*Primary Examiner* — Y M Lee
(74) *Attorney, Agent, or Firm* — Muncy, Geissler, Olds & Lowe, P.C.

(57) ABSTRACT

A substrate is formed in a rectangular shape, a plurality of light emitting elements are arranged on one end face of the substrate, and a translucent sealing material is adhered to the one end face to seal the light emitting elements. A light irradiation device is thin, which transfers heat generated at the light emitting elements to the substrate where the heat is dissipated. Even if the substrate is made thinner, the heat dissipation performance of the substrate can be maintained or enhanced when the dimension of the substrate is increased in the direction intersecting the one end face of the substrate.

12 Claims, 13 Drawing Sheets

(51) Int. Cl.
  *G02F 1/1335* (2006.01)
  *F21V 8/00* (2006.01)
  *F21Y 101/00* (2016.01)

(52) U.S. Cl.
  CPC ....... *F21V 19/0015* (2013.01); *F21V 19/0025* (2013.01); *F21Y 2101/00* (2013.01); *G02B 6/0068* (2013.01); *G02B 6/0083* (2013.01); *G02F 2001/133628* (2013.01)

(56) References Cited

FOREIGN PATENT DOCUMENTS

| | | |
|---|---|---|
| JP | 2006-344450 A | 12/2006 |
| JP | 2007-194161 A | 8/2007 |
| JP | 2008-053571 A | 3/2008 |
| JP | 2008-198460 A | 8/2008 |
| JP | 2009-199871 A | 9/2009 |
| JP | 2010-109321 A | 5/2010 |
| WO | WO 2008/099542 A1 | 8/2008 |

* cited by examiner

LIGHT IRRADIATION DEVICE, BACKLIGHT DEVICE AND DISPLAY APPARATUS

CROSS-REFERENCE TO RELATED APPLICATIONS

This application is the national phase under 35 U.S.C. §371 of PCT International Application No. PCT/JP2013/073497which has an International filing date of Sep. 2, 2013 and which claims priority to Japanese Application No. 2012-194307 which has a filing date of Sep. 4, 2012 and which are both herein incorporated by reference.

FIELD

The present invention relates to a light irradiation device emitting light to make the light enter an end face of a light guide plate or the like, and also to a backlight device as well as a display apparatus that are of an edge light type.

BACKGROUND

A display apparatus having a display panel with liquid crystal or the like uses a backlight device employing an LED (Light Emitting Diode) or the like as a light source, to display a character, an image, a video image and the like on a screen by making light enter from the back surface side of the display panel. For example, a small- or medium-sized backlight device for liquid-crystal display used in a mobile phone, mobile terminal or the like often employs an edge light type in which light enters an end face of a light guide plate to be outputted from a plate surface of the light guide plate, in order to realize thinning of the device.

Japanese Patent Application Laid-Open Publication No. 2009-199871 discloses a display apparatus using a backlight device of an edge light type. The display apparatus includes a display element (corresponding to a display panel) on which a picture of a guide lamp is printed, a light guide plate which irradiates a rear surface of the display element with light, a light source which emits light entering the light guide plate, and a light source holder which holds the light source. The light guide plate has a thin rectangular shape, and a light entering surface is formed on a side surface substantially orthogonal to a main surface thereof. The light guide plate has a light guiding part having a tapered shape which has an increased thickness on the side of the light entering surface within a predetermined area of the light entering surface side.

A plurality of LEDs of a top view type are used as the light source, the LEDs being arranged on a surface of a strip-shaped LED mounting substrate, while the LED mounting substrate being opposed to the light entering surface of the light guide plate. The light source holder has an L shape, and has a bottom part located along the light guide plate as well as a side part substantially orthogonal to the bottom part and to which the LED mounting substrate is attached. The LEDs of the top view type arranged on the surface of the LED mounting substrate emits light with the surface normal direction of the LED mounting substrate determined as a main direction, and the light enters into the light guiding part from the light entering surface of the light guide plate. Since the light guiding part has a tapered shape in which the thickness thereof decreases from the light entering surface side toward the middle part of the light guide plate, the light entering from the light entering surface is reflected by the inclined surface of the tapered shape while being guided to the middle part of the light guide plate, and is outputted from the main surface of the light guide plate. In the display apparatus according to Japanese Patent Application Laid-Open Publication No. 2009-199871, therefore, since the light guide plate has the tapered light guiding part which allows a larger amount of light to enter from the light entering surface, it is possible to attempt thinning of the light guide plate and also of the display apparatus.

In general, the light guide plate as disclosed in Japanese Patent Application Laid-Open Publication No. 2009-199871 is fabricated by injection molding. Though it has been required for a middle-or small-sized light guide plate used for a mobile phone or mobile terminal to be thinner, in injection molding, there are constraints of the panel size for thinning of the light guide plate. In the current circumstances, the thickness of approximately 1.0 mm is the main stream for a light guide plate having the size of approximately several to ten inches, and practical realization has been expected for an even thinner light guide plate having the thickness of approximately 0.3 mm.

SUMMARY

In the display apparatus described in Japanese Patent Application Laid-Open Publication No. 2009-199871, however, an LED of a top view type is used as a light source, which requires an enough space for the outer dimension of the LED package, raising a problem of an increased thickness of a light source part.

Even if the light guide plate is thinned by improving the light guide plate as described above, a thickness corresponding to the light source part is required at the back surface side of the display panel. The light source part may possibly be located at a side part of the display panel in order to avoid such a problem, which however increases the size of the border part of the display panel.

Using an LED of a side view type, it is possible to reduce the thickness of the light source part in some degree compared to the case where the LED of the top view type is used. It is, however, still required to have an enough space for the outer dimension of the LED package as in the case of the LED of the top view type. Moreover, the LED of the side view type has poor heat dissipation performance compared to the top view type and has a short operating life, which is not fitted for enlarged current. This also causes such problems that it is difficult to increase the luminance by enlarging current and to decrease the cost by reducing the number of LEDs as a result of enlarged current.

The present invention has been made in view of the circumstances described above, and aims to provide a light irradiation device which is preferable to irradiate a light guide plate or the like with light, is thin and has good heat dissipation performance, and to also provide a backlight device as well as a display apparatus including the light irradiation device.

A light irradiation device according to the present invention is characterized by including: a substrate formed in a rectangular shape; a plurality of light emitting elements arranged on one end face of the substrate; and a translucent sealing material adhered to the one end face to seal the plurality of light emitting elements.

According to the present invention, the plurality of light emitting elements are arranged on the one end face of the substrate formed in a rectangular shape, and the translucent sealing material is adhered to the one end face to seal the light emitting elements. This makes it possible to reduce the thickness of the light irradiation device and to transfer heat generated at the light emitting elements to the substrate where it is dissipated.

The light irradiation device according to the present invention is characterized in that a connecting line for carrying electric current to the plurality of light emitting elements is sealed with the sealing material.

According to the present invention, the sealing material seals the connecting line for carrying electric current to the light emitting elements, thereby protecting the light emitting elements and the connecting line.

The light irradiation device according to the present invention is characterized by including a reinforcement plate bonded to one surface of the substrate and protruding from the one end face, and characterized in that the sealing material is adhered to a portion protruding from the one end face of the reinforcement plate.

According to the present invention, the reinforcement plate is bonded to the one surface of the substrate, and protrudes from the one end face. The sealing material is adhered to the portion protruding from the one end face of the reinforcement plate. The reinforcement plate can enhance the strength of the substrate and can also securely hold the sealing material.

The light irradiation device according to the present invention is characterized in that the reinforcement plate is provided with a light reflection layer at the portion protruding from the one end face.

According to the present invention, the reinforcement plate is provided with the light reflection layer at the portion protruding from the one end face, so that the light generated at the light emitting elements can be reflected by the light reflection layer and thus a large amount of light can be emitted.

The light irradiation device according to the present invention is characterized in that the reinforcement plate is bent at a side of another end face of the substrate.

According to the present invention, the reinforcement plate is bent at the side of another end face of the substrate, which can further enhance the strength of the substrate.

The light irradiation device according to the present invention is characterized by including a plate member bonded to another surface of the substrate and protruding from the one end face, and characterized in that the sealing material is adhered to a portion protruding from the one end face of the plate member.

According to the present invention, the plate member is bonded to another surface of the substrate, and protrudes from the one end face. The sealing material is adhered to the portion of the plate member protruding from the one end face, so as to be securely held thereat.

The light irradiation device according to the present invention is characterized in that the substrate includes a convex part projecting from the one end face at each of both ends of the one end face, and the sealing material is placed to a midway part of the convex part.

According to the present invention, the sealing material is placed to a midway part of the convex part projecting from the one end face at each of both ends of the one end face. Thus, an end face of the light guide plate or the like arranged to be opposed to the light irradiation device makes contact with the convex part, thereby preventing the end face of the light guide plate or the like from being directly in contact with the sealing material and applying stress on the light emitting elements or the connecting line.

The light irradiation device according to the present invention is characterized in that the substrate is provided with a connecting terminal for connection to the plurality of light emitting elements on the one end face.

According to the present invention, by the light emitting elements and the connecting terminal provided on the one end face being connected with each other, a plurality of light emitting elements can emit light.

The light irradiation device according to the present invention is characterized in that the substrate is made by using aluminum or aluminum alloy.

According to the present invention, the substrate is made by using aluminum or aluminum alloy, thereby achieving high thermal conductivity and preferable heat dissipation performance.

The light irradiation device according to the present invention is characterized in that the reinforcement plate is made by using stainless steel.

According to the present invention, the reinforcement plate is made by using stainless steel, which can reduce the thickness and increase the strength while maintaining the heat dissipation performance.

A backlight device according to the present invention is characterized by including: the light irradiation device according to any one of the descriptions above; and a light guide plate formed in a rectangular shape, having one end face opposed to the one end face of the light irradiation device, and outputting light entering the one end face of the light guide plate from one main surface.

According to the present invention, the light emitted from the light irradiation device according to any one of the descriptions above enters the one end face of the light guide plate, and the entered light is outputted from the one main surface of the light guide plate.

A display apparatus according to the present invention is characterized by including: the backlight device described above; and a display panel on which an image is displayed, and characterized in that the one main surface of the light guide plate is arranged to be opposed to an opposite face of an image-displaying surface of the display panel.

According to the present invention, the light emitted from the one main surface of the light guide plate in the backlight device described above enters the display panel opposed to the one main surface, and an image is displayed on the display panel.

According to the present invention, a plurality of light emitting elements are arranged on one end face of a substrate having a rectangular shape, and a translucent sealing material is bonded to the one end face to seal the light emitting elements. This makes it possible to reduce the thickness of the light irradiation device and to transfer the heat generated at the light emitting elements to the substrate where the heat is dissipated.

The above and further objects and features will more fully be apparent from the following detailed description with accompanying drawings.

DETAILED DESCRIPTION

The present invention will specifically be described with reference to the drawings illustrating the embodiments thereof. While the present embodiment describes an example where the display apparatus is a liquid-crystal display apparatus, the technique of the present invention may also be applicable to an apparatus having a function of displaying an image or the like on a display surface, and also to an apparatus including a touch panel to allow for input operation.

Figure 1:
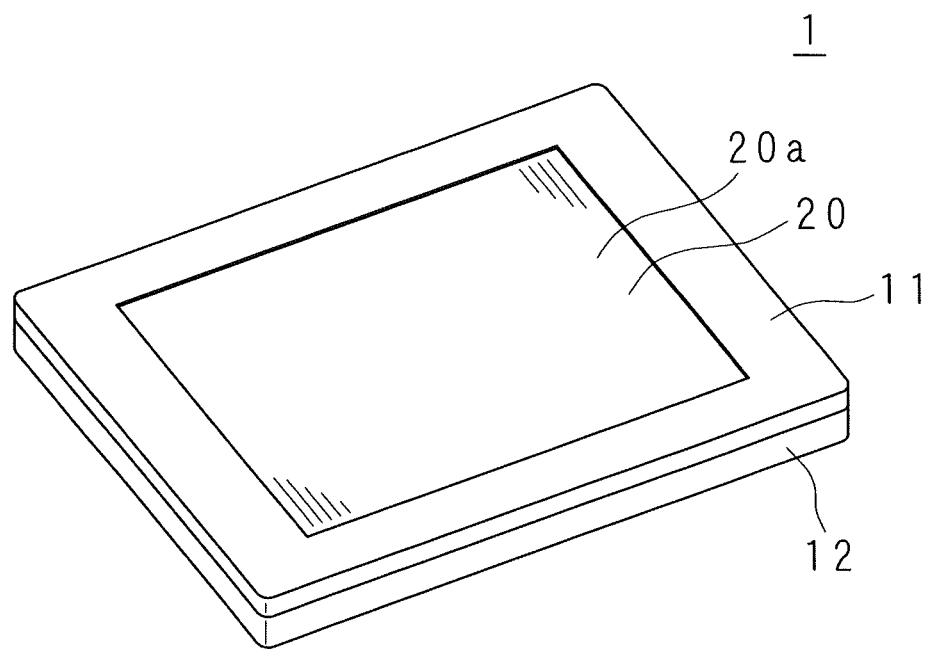
FIG. 1 is a perspective view of a display apparatus according to an embodiment.
Figure 2:
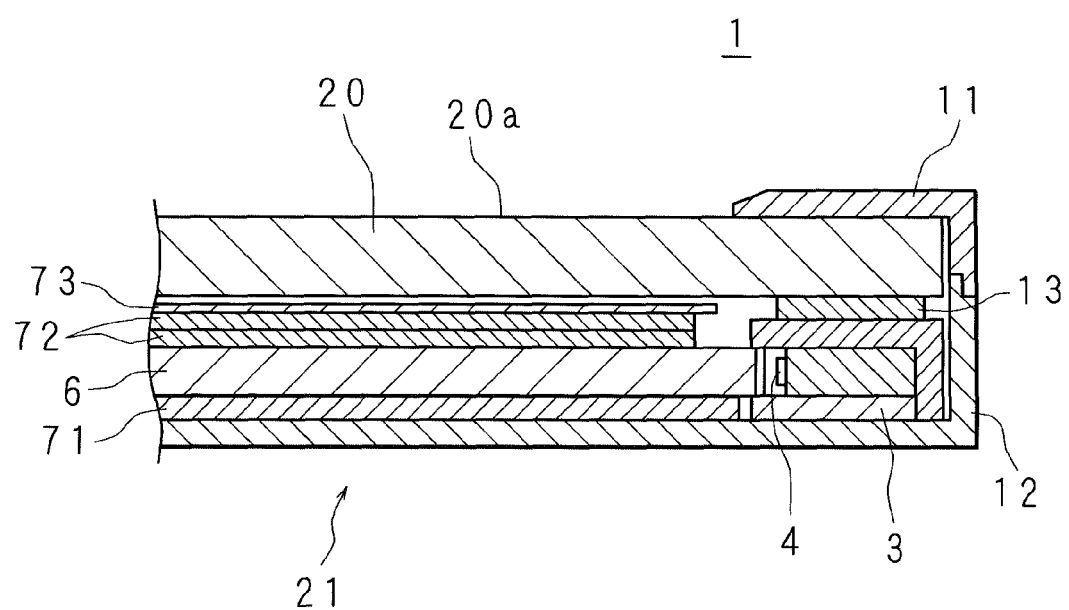
FIG. 2 is a vertical side section view of the display apparatus.

FIG. 1 is a perspective view of a display apparatus 1 according to an embodiment; and FIG. 2 is a vertical side section view of the display apparatus 1. The display apparatus 1 is constituted by a liquid-crystal display panel 20 having a display surface 20a on which an image is displayed, a backlight device 21 located on the back surface of the liquid-crystal display panel 20, a frame body 11 covering a peripheral part and side surfaces of the display surface 20a of the liquid-crystal display panel 20, and a casing 12 covering the back surface side and side surfaces of the backlight device 21. The backlight device 21 includes a light guide plate 6, a prism sheet 72 and a diffusion sheet 73 located between the liquid-crystal display panel 20 and the light guide plate 6, and a light irradiation device 3 located at a side part of the light guide plate 6.

The liquid-crystal display panel 20 has the shape of a rectangular parallelepiped, and is connected to a liquid-crystal display circuit (not illustrated) for applying a display signal to liquid-crystal elements in the liquid-crystal display panel 20. The light guide plate 6 is a thin plate or sheet formed in a rectangular shape having a substantially uniform thickness using a translucent material. The light guide plate 6 is generally made of acrylic resin or the like such as, for example, polycarbonate or PMMA (polymethyl methacrylate resin), but is not limited thereto. Furthermore, the light guide plate 6 may be provided, at an end thereof, with a light guiding part described in the prior art. The light guide plate 6 is so arranged that one end face thereof is opposed to the light irradiation device 3, which will be described later, and that one main surface is opposed to the back surface of the liquid-crystal display panel 20, the one main surface outputting the light entering from the one end face and being guided to the middle. On the other main surface on the opposite side of the one main surface of the light guide plate 6, a number of concave and convex patterns are formed by a molding process such as heat transfer, so that the light traveling inside the light guide plate 6 is reflected to the side of the one main surface. On the opposite side of the liquid-crystal display panel 20 of the light guide plate 6, a reflection sheet 71 for reflecting light to the light guide plate 6 is placed.

Between the liquid-crystal display panel 20 and the light guide plate 6, the prism sheet 72 and the diffusion sheet 73 are so arranged as to cover the main surface (light emitting surface) of the light guide plate 6. The prism sheet 72 serves to enhance the light concentration of the light emitted from the light emitting surface of the light guide plate 6 in the direction of the liquid-crystal display panel 20. The diffusion sheet 73 diffuses the incident light so as to reduce the luminance unevenness in the light outputted from the prism sheet 72, and outputs the light to the back surface of the liquid-crystal display panel 20.

The light irradiation device 3 is formed in a rectangular shape, and has a plurality of light emitting elements 4 that emit light.

The casing 12 includes a rectangular bottom plate and side plates rising from four sides of the bottom plate to the liquid-crystal display panel 20 side, and forms a box-like shape with the liquid-crystal display panel 20 side being open. The frame body 11 includes: a frame having the shape of a rectangular picture frame, which covers the peripheral part of the liquid-crystal display panel 20 at the display surface 20a side; and side plates rising from four sides forming the outer circumference of the frame to the liquid-crystal display panel 20 side. Inside the casing 12, the reflection sheet 71, the light guide plate 6, the prism sheet 72 and the diffusion sheet 73 are layered, while the light irradiation device 3 is placed at a side part of the light guide plate 6. Furthermore, the liquid-crystal display panel 20 is placed on the diffusion sheet 73, the frame body 11 is put over the display surface 20a side of the liquid-crystal display panel 20, and the ends of the side plates of the frame body 11 are fitted and fixed to the end of the side plates of the casing 12, to assembly the display apparatus 1. The light guide plate 6 and the light irradiation device 3 constitute a backlight device of an edge light type in the state of being accommodated in the frame body 11 and casing 12. It is to be noted that a spacer 13 may appropriately be used so that components accommodated inside are stable.

Figure 3:
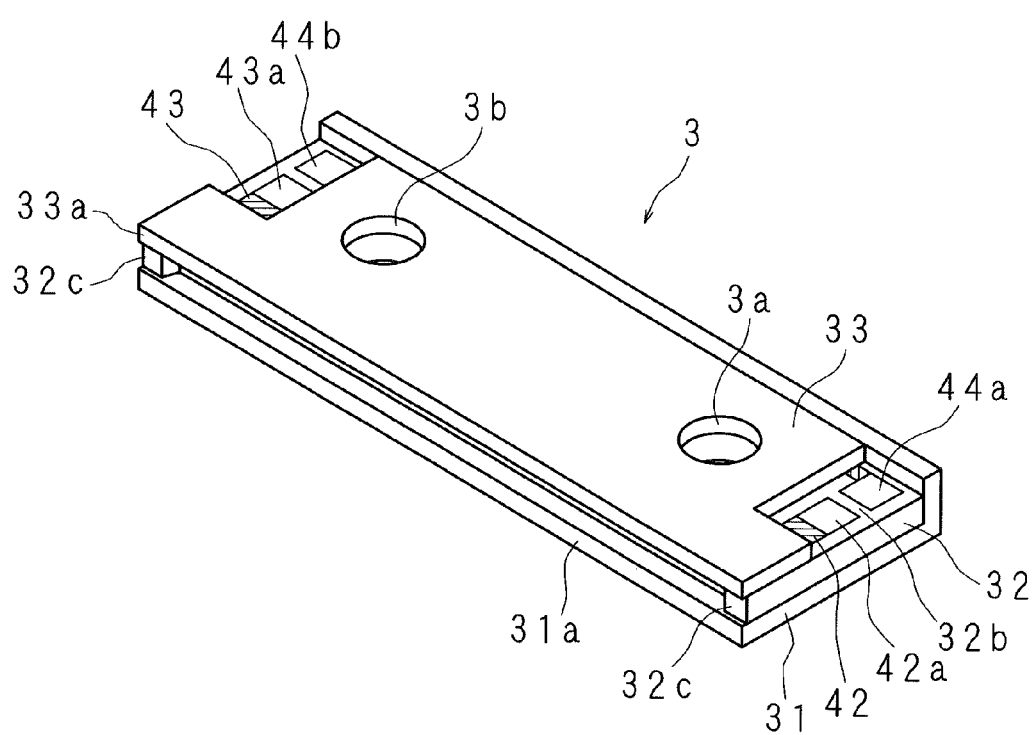
FIG. 3 is a perspective view of a light irradiation device.
Figure 4:
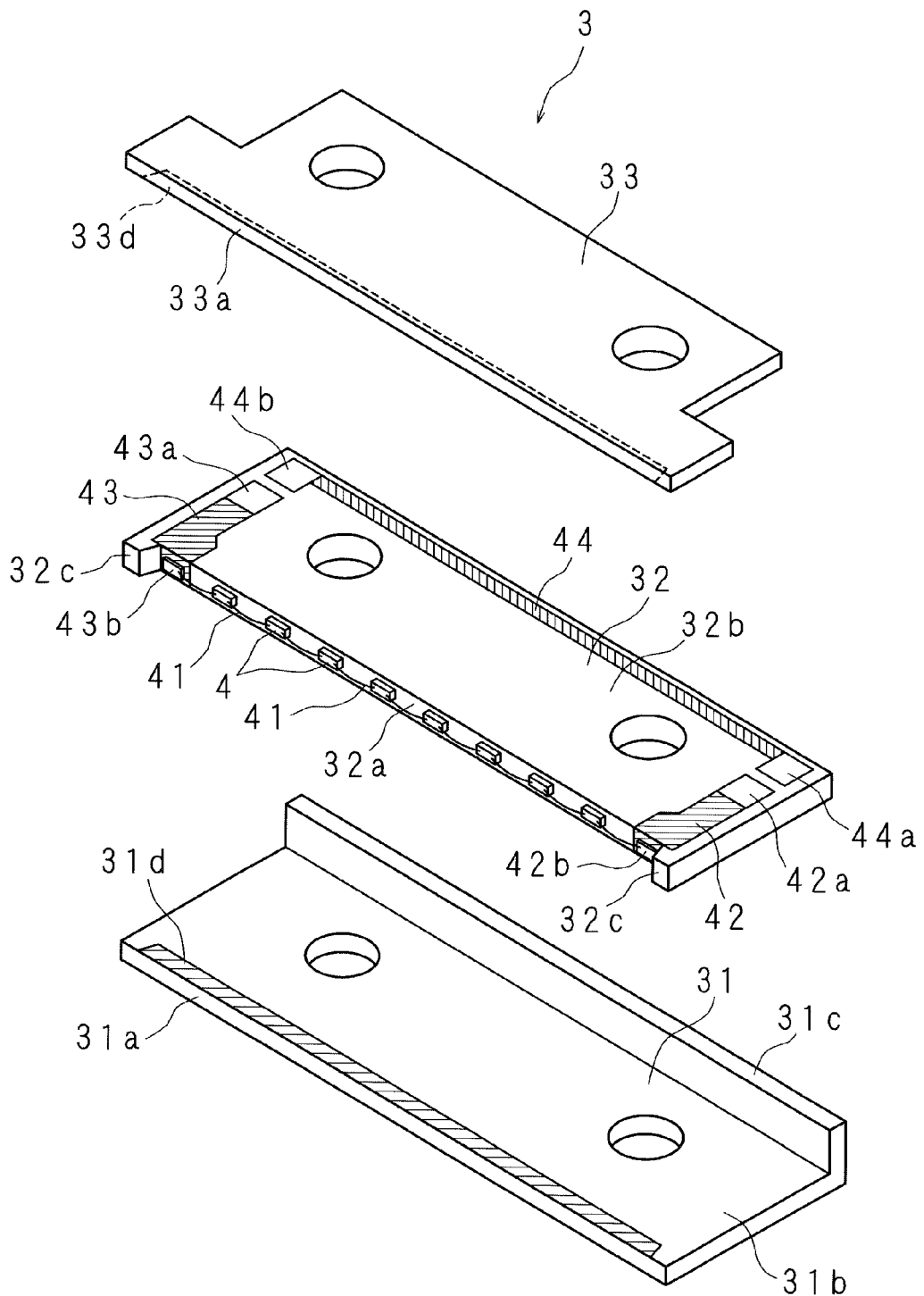
FIG. 4 is an exploded perspective view of the light irradiation device.
Figure 5:
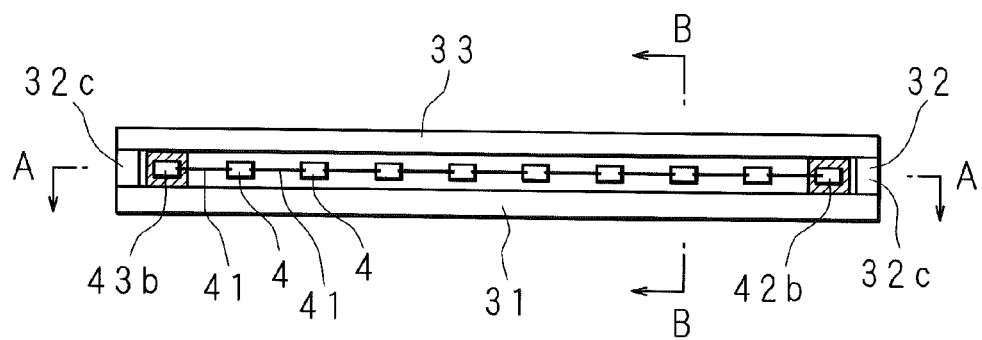
FIG. 5 is a front view of the light irradiation device.
Figure 6:
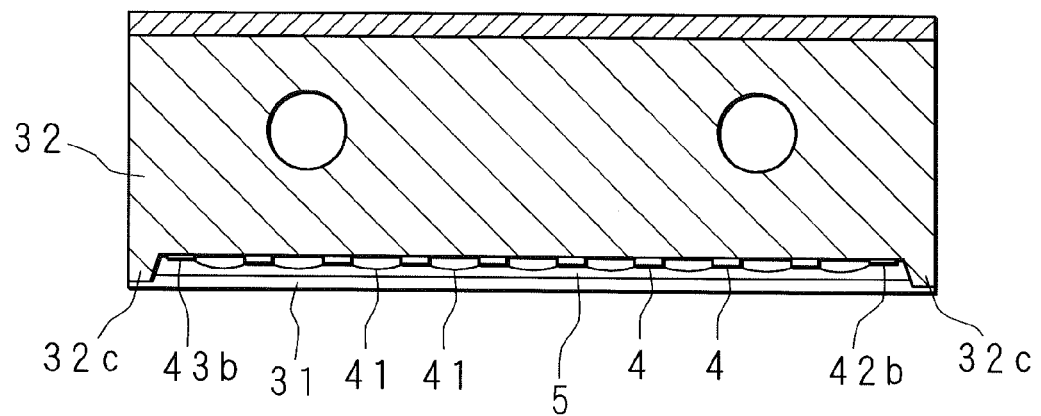
FIG. 6 is a section view of the light irradiation device cut along a cross section A-A illustrated in FIG. 5.
Figure 7:
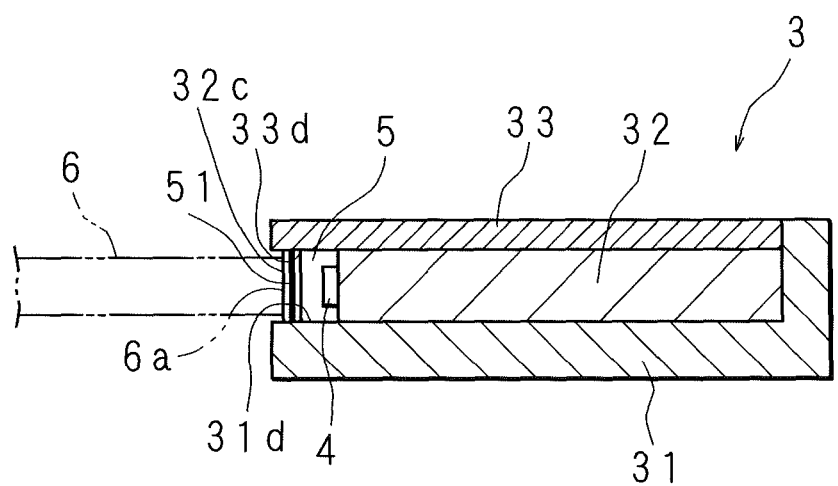
FIG. 7 is a section view cut along a cross section B-B illustrated in FIG. 5.

Next, a detailed configuration of the light irradiation device 3 will be described. FIG. 3 is a perspective view of the light irradiation device 3; FIG. 4 is an exploded perspective view of the light irradiation device 3; FIG. 5 is a front view of the light irradiation device 3; FIG. 6 is a section view of the light irradiation device 3 cut along a cross section A-A illustrated in FIG. 5; and FIG. 7 is a section view cut along a cross section B-B illustrated in FIG. 5. The light irradiation device 3 includes a substrate 32 on which a plurality of light emitting elements 4 are arranged, as well as a reinforcement plate 31 and a plate member 33 for reinforcing the substrate 32.

The substrate 32 has a rectangular shape, and a plurality of light emitting elements 4, 4, . . . are arranged side by side from one end to the other end in the longitudinal direction of one end face 32a, while convex parts 32c, 32c projecting from the one end face 32a are formed at the above-described one and the other ends. Each of the light emitting elements 4, 4 . . . is a single LED chip, which is smaller than a packaged LED and can be arranged at an end face of a thin substrate. Moreover, each of the light emitting elements 4, 4 . . . has a configuration in which a diode is located on an insulator. Connecting lines 42, 43 for connection to the light emitting elements 4, 4, . . . are provided over the areas from the one and other ends of one end face 32a to the respective both ends of a main surface 32b. In the drawings, the hatched portions are insulation-coated. The both ends of the connecting line 42 are not insulation-coated, and connecting terminals 42a, 42b are exposed. Likewise, the both ends of the connecting line 43 are not insulation-coated, and connecting terminals 43a, 43b are exposed. The connecting terminals 42b and 43b are silver-plated. Furthermore, along an end face opposite from the one end face 32a side of the substrate 32, an insulation-coated connecting line 44 is provided on the main surface 32b, while connecting terminals 44a and 44b that are not insulation-coated are exposed at both ends of the connecting line 44. In the case where the substrate 32 has an oblong shape, the one end face 32a may correspond to one end face in the short direction, and the light emitting elements 4, 4 . . . may be arranged on the one end face along the longitudinal direction.

As a material for the substrate 32, a metal material with preferable thermal conductivity such as aluminum or aluminum alloy may be used. The substrate 32 made of such a material is suitable for eliminating heat generated at the light emitting elements 4, 4 . . . . The substrate 32 may preferably have a thickness of, for example, in the range from approximately 0.3 mm to approximately 1.0 mm, which contributes to the thinning of the light irradiation device 3. Contrary to the thickness of the substrate 32, the main surface 32b of the substrate 32 is configured to have a sufficiently large dimension such as, for example, 10 mm×160 mm. Moreover, the light emitting elements 4, 4 . . . are insulated from the substrate 32 by the respective insulators included therein. Furthermore, the substrate 32 may be a glass-epoxy substrate as long as the light emitting elements 4, 4 . . . are ensured to have a heat dissipating property. In addition, the substrate 32 may also be made of ceramic.

Figure 8:
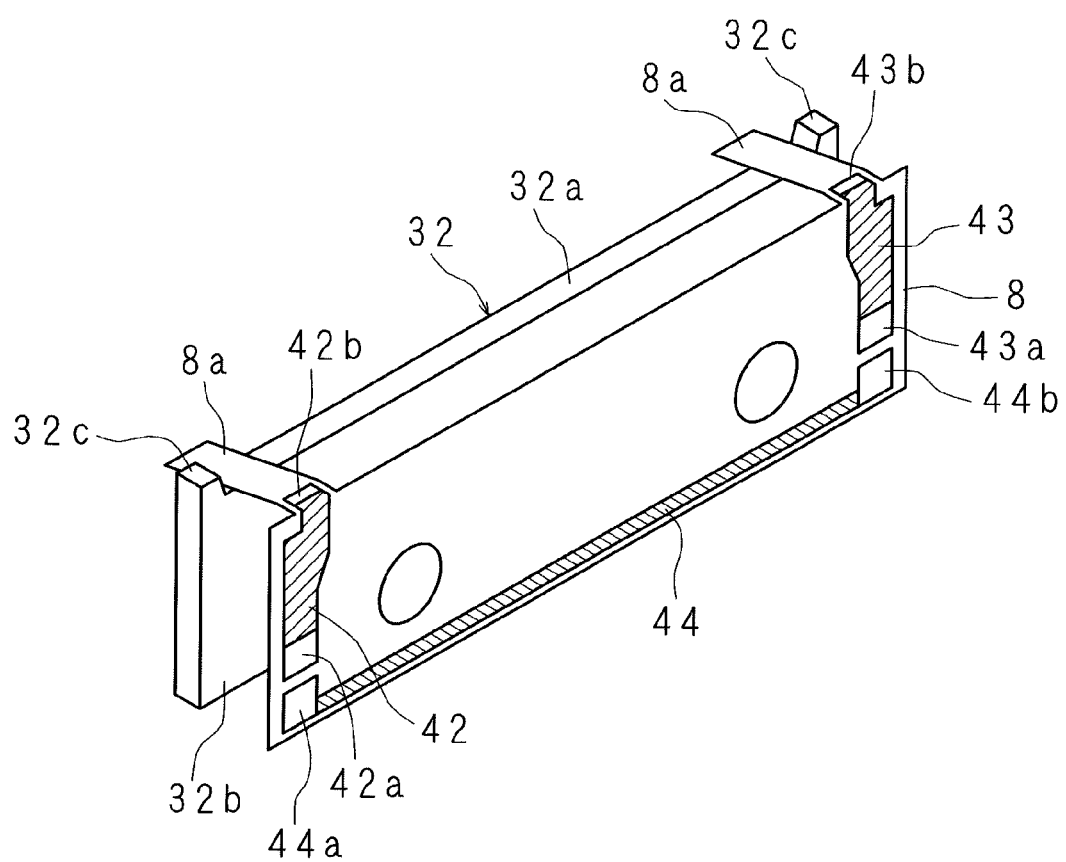
FIG. 8 is a perspective view of an insulator sheet for interconnection used for a substrate.

FIG. 8 is a perspective view of an insulator sheet 8 for interconnection used for the substrate 32. The connecting lines 42, 43 and 44 described above are located on the rectangular insulator sheet 8, while the insulator sheet 8 is fixed by bonding it onto the main surface 32b of the substrate 32. Attachments 8a, 8a extending from one end of the insulator sheet 8 are wrapped and fixed onto a main surface on the opposite side of the main surface 32b. The use of the insulator sheet 8 allows the connecting lines 42, 43, 44 and the like to easily be provided on the substrate 32. Furthermore, though it is configured in the case of the insulator sheet 8 illustrated in FIG. 8 that the connecting terminals 42b and 43b are provided at both ends on the one end face 32a, it is also possible to provide one or more connecting terminals at a middle part in the longitudinal direction of the one end face 32a. In the case of not using the insulator sheet 8, portions provided with the connecting lines 42, 43, 44 and the like may be configured to have an insulating property by partly being coated with glass or the like, while sufficiently ensuring the heat dissipating property of the substrate 32.

The light emitting elements 4, 4 . . . are serially connected by wires 41, 41 . . . that are electric connection lines for carrying electric current to the light emitting elements 4, 4 . . . , while the light emitting elements 4, 4 located at both ends are connected to the connecting terminals 42b, 43b through wires 41, 41. On the one end face 32a, a translucent sealing material 5 for sealing the light emitting elements 4, 4 . . . and the wires 41, 41 . . . is adhered to the one end face 32a, and fills between the convex parts 32c and 32c. The sealing material 5 fills from base ends of the convex parts 32c, 32c (i.e. the one end face 32a) to respective positions slightly lower than the tip ends of the convex parts 32c, 32c. In other words, the sealing material 5 fills to a midway part of each of the convex parts 32c, 32c. It is also possible to provide connecting terminals between the light emitting elements 4, 4 . . . and to use the wires 41, 41 . . . to connect the light emitting elements 4, 4 . . . with one another through the connecting terminals.

A fluorescent sheet 51 is placed between the sealing material 5 and an end face 6a of the light guide plate 6 (see FIG. 7). By the fluorescent sheet 51, the light generated at the light emitting elements 4, 4 . . . is wavelength-converted into light of a desired color, e.g., white light. It is also possible not to employ the fluorescent sheet 51 by making the sealing material 5 contain a fluorescent substance. It is to be noted that the sealing material 5 may be a material not containing a fluorescent substance and the fluorescent sheet 51 may also be unnecessary when the light emitting elements 4, 4 . . . are configured to have surfaces including a fluorescent substance and the light emitting elements 4, 4 . . . emit light of a desired wavelength.

The reinforcement plate 31 includes a side plate 31c formed by bending an end of a bottom plate 31b serving as a rectangular main surface to the substrate 32 side, and has an L-shaped cross section. The side plate 31c may also be bent toward the opposite side of the substrate 32 side. However, by bending the side plate 31c toward the substrate 32 side as illustrated, the ends of the substrate 32 and plate member 33 can be in contact with the side plate 31c during assembly, which improves the manufacturability. One end of the reinforcement plate 31 corresponding to the one end face 32a side of the substrate 32 protrudes from the one end face 32a of the substrate 32, and also protrudes further than the tip end faces of the convex parts 32c, 32c of the substrate 32.

Furthermore, a light reflection layer 31d is located at the periphery of the bottom plate 31b of the reinforcement plate 31 at the one end face 31a side. The dimension in the longitudinal direction of the light reflection layer 31b is equal to or larger than the distance between the convex parts 32c and 32c of the substrate 32, while the dimension in the short direction thereof is equal to or larger than the distance between the one end face 31a of the reinforcement plate 31 and the one end face 32a of the substrate 32. The light reflection layer 31d is formed by white resist printing, silver plating, polishing or the like. Moreover, as the material for the reinforcement plate 31, a metal material such as stainless steel which has high strength and rigidity may preferably be used. In the present invention, it is preferable for the reinforcement plate 31 itself to have a thickness of approximately 0.2 mm for example, in order to reduce the thickness of the light irradiation device 3, and also to be made of a material having high strength and rigidity. Note that ceramic may be used as the material for the reinforcement plate 31.

The plate member 33 has a rectangular shape from which portions on both ends are cut out so as to expose the connecting terminals 42a, 43a, 44a and 44b. One end of the plate member 33 corresponding to the one end face 32a side of the substrate 32 protrudes from the one end face 32a of the substrate 32, and also protrudes further than the tip end faces of the convex parts 32c, 32c of the substrate 32. Furthermore, a light reflection layer 33d is located at the periphery of the main surface of the plate member 33 facing the substrate 32 on the side of one end face 33a of the plate member 33. The dimension in the longitudinal direction of the light reflection layer 33d is equal to or larger than the distance between the convex parts 32c and 32c of the substrate 32, while the dimension in the short direction thereof is equal to or larger than the distance between the one end face 33a of the plate member 33 and the one end face 32a of the substrate 32.

Furthermore, as a material for the plate member 33, a metal material having good thermal conductivity such as aluminum or aluminum alloy may preferably be used, which is suitable as a heat transfer path for the heat generated at the substrate 32. Moreover, it is preferable for the plate member 33 to have a thickness of, for example, approximately 0.1 mm, which contributes to reduction in the thickness of the light irradiation device 3. Note that ceramic may be used as the material for the plate member 33.

The substrate 32, the reinforcement plate 31 and the plate member 33 are integrated by bonding the main surfaces thereof with one another using an adhesive or the like. The adhesive to be used may preferably have high thermal conductivity. It is also possible to first integrate the substrate 32, the reinforcement plate 31 and the plate member 33 together and then a sealing material 5 fills to the one end face 32a, which also allows the sealing material 5 to be adhered not only to the one end face 32a but also to the protruding portions of the reinforcement plate 31 and plate member 33 protruding from the one end face 32a, enhancing the adhering strength of the sealing material 5. Moreover, two through holes 3a, 3b penetrating the light irradiation device 3 are formed, thereby ensuring alignment of the substrate 32, the reinforcement plate 31 and the plate member 33 using the through holes 3a, 3b. The through holes 3a, 3b can also be utilized as holes for fastening members such as screws to pass through when the light irradiation device 3 is attached to the casing 12.

Next, the operation of the light irradiation device 3 and the display apparatus 1 will be described. The connection terminals 4b and 43b of the light irradiation device 3 are connected to a power supply through a switch element, a smoothing circuit and the like (not illustrated). The switch element is turned on to light up the light emitting elements 4, 4 . . . of the light irradiation device 3. The light emitted by the light emitting elements 4, 4 . . . passes through the translucent sealing material 5 and is outputted toward the normal direction of the one end face 32a (the light guide plate 6 side), while a part of the light is reflected by the light reflection layer 31d of the reinforcement plate 31 and the light reflection layer 33d of the plate member 33, and is outputted toward the normal direction of the one end face 32a.

The light irradiation device 3 irradiates one end face 6a of the light guide plate 6 opposed to the one end face 32a with light. The light entering from the one end face 6a of the light guide plate 6 and guided to the middle part is outputted from the main surface of the light guide plate 6. The light outputted from a surface opposite from the main surface of the light guide plate 6 (surface on the side of the bottom plate of the casing 12) is reflected by the reflection sheet 71 and is outputted from the main surface.

The light outputted from the main surface of the light guide plate 6 is improved in its light concentration in the direction of the liquid-crystal display panel 20 by the prism sheet 72 and is reduced in its luminance unevenness by the diffusion sheet 73, and then enters the back surface of the liquid-crystal display panel 20. In the liquid-crystal display panel 20, the liquid-crystal elements are controlled by the display signal applied from the liquid-crystal display circuit, and the light entering the back surface of the liquid-crystal display panel 20 is, for example, deflected by the liquid-crystal elements to form an image and display the image on the display surface 20a.

As described above, according to the present embodiment, the substrate 32 has a rectangular shape, the light emitting elements 4, 4 . . . are arranged on the one end face 32 of the substrate 32, and the translucent sealing material 5 is adhered to the one end face 32a to seal the light emitting elements 4, 4 . . . . Accordingly, the thickness of the light irradiation device 3 can be reduced, while the heat generated at the light emitting elements 4, 4 . . . is transferred to the substrate 32 for heat dissipation. Even with the substrate 32 having a reduced thickness, the heat dissipation performance of the substrate 32 can be maintained or enhanced when the dimension of the substrate 32 is increased in the direction intersecting the one end face 32a of the substrate 32.

Furthermore, according to the present embodiment, the sealing material 5 is used to seal the wires 41, 41 . . . for carrying electric current to the light emitting elements 4, 4 . . . , thereby protecting the light emitting elements 4, 4 . . . and the wires 41, 41 . . . .

Furthermore, according to the present embodiment, the reinforcement plate 31 is bonded to one surface of the substrate 32, and protrudes from the one end face 32a of the substrate 32. The sealing material 5 is adhered to the portion of the reinforcement plate 31 protruding from the one end face 32a. The reinforcement plate 31 can enhance the strength of the light irradiation device 3, while securely holding the sealing material 5.

Furthermore, according to the present embodiment, since the light reflection layer 31d is located at the portion of the reinforcement plate 31 protruding from the one end face 32a, the light generated at the light emitting elements 4, 4 . . . is reflected by the light reflection layer 31d and thus a large amount of light can be emitted. Moreover, the light generated at the light emitting elements 4, 4 . . . can also be reflected by the light reflection layer 33d of the plate member 33, so that a large amount of light can be emitted.

Furthermore, according to the present embodiment, the reinforcement plate 31 has the side plate 31c bent at the other end face side of the substrate 32, thereby enhancing the strength of the light irradiation device 3.

Furthermore, according to the present embodiment, the plate member 33 is adhered to the substrate 32, and protrudes from the one end face 32a of the substrate 32. The sealing material 5 is adhered to the portion of the plate member 33 protruding from the one end face 32a. The plate member 33 makes the heat dissipation performance preferable, while securely holding the sealing material 5.

Furthermore, according to the present embodiment, the convex parts 32c, 32c projecting from one end face 32a are provided on both ends of the one end face 32a of the substrate 32a. The sealing material 5 fills to a midway part of each of the convex parts 32c, 32c. Therefore, the end face of the light guide plate 6 or the like arranged to be opposed to the light irradiation device 3 makes contact with the convex parts 32c, 32c, which can prevent the end face of the light guide plate 6 or the like from directly being in contact with the sealing material 5 and from applying stress on the light emitting elements 4, 4 . . . as well as the wires 41, 41 . . . . Moreover, because the reinforcement plate 31 and the plate member 33 protrude further than the convex parts 32c, 32c of the substrate 32, it is possible to use the protruding portions to sandwich the end of the light guide plate 6 or the like between the reinforcement plate 31 and the plate member 33, which facilitates the positioning of the end of the light guide plate 6 or the like and the light irradiation device 3.

Furthermore, according to the present embodiment, by causing electric current to flow in the connecting terminals 42b, 43b provided on the one end face 32a of the substrate 32, the light emitting elements 4, 4 . . . can emit light.

Furthermore, according to the present embodiment, aluminum or aluminum alloy is used for the substrate 32, thereby achieving high thermal conductivity and preferable heat dissipation performance. Moreover, the reinforcement plate 31 is made by using stainless steel, which can enhance the strength of the light irradiation device 3.

(Modifications)

Various modifications will be described below.

Figure 9:
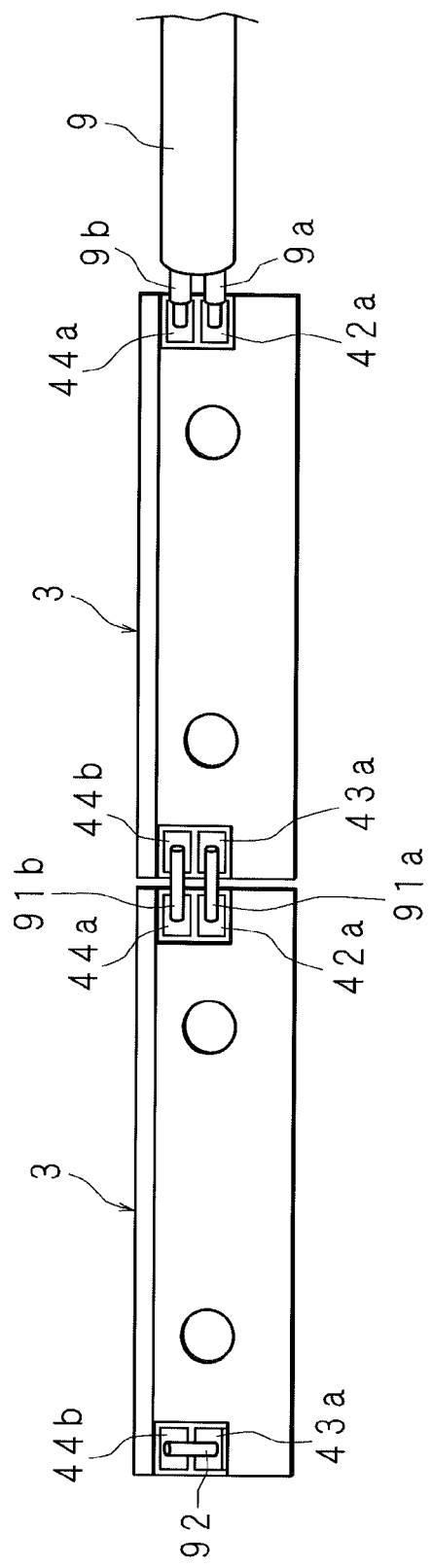
FIG. 9 is a schematic view for illustrating a configuration in the case where light irradiation devices are arranged side by side according to a modification.

FIG. 9 is a schematic view for illustrating a configuration in a case where light irradiation devices 3 are arranged side by side according to a modification. Two light irradiation devices 3 are arranged side by side, while an electric wire 9a of a lead wire 9 is connected to a connecting terminal 42a of one light irradiation device 3, and an electric wire 9b is connected to a connecting terminal 44a of the one light irradiation device 3. A connecting terminal 43a of the one light irradiation device 3 and a connecting terminal 42a of the other light irradiation device 3 are connected through a short pin 91a, while a connecting terminal 44b of the one light irradiation device 3 and a connecting terminal 44a of the other light irradiation device 3 are connected through a short pin 91b. A connecting terminal 43a and a connecting terminal 44b of the other light irradiation device 3 are connected with each other through a short pin 92. A plurality of light irradiation devices 3 are connected using the connecting lines 42, 43 and 44 provided on the substrate 32, so that power is supplied to the respective light emitting elements 4, 4 . . . of the light irradiation devices 3, which can be used while being arranged side by side.

Figure 10:
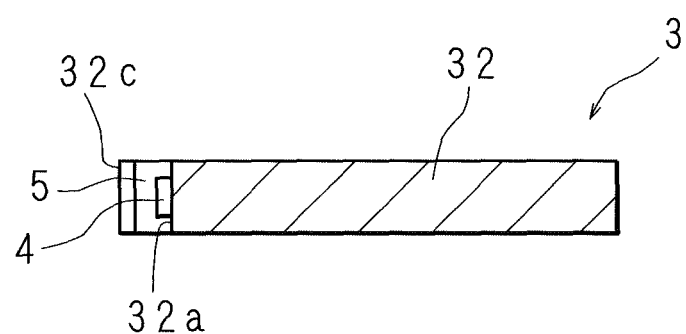
FIG. 10 is a schematic view illustrating a configuration of a light irradiation device according to another modification.

FIG. 10 is a schematic view illustrating a configuration of a light irradiation device 3 according to another modification. In this modification, light emitting elements 4, 4 . . . are arranged on one end face 32a of a substrate 32, and are sealed with a sealing material 5, not using a reinforcement plate 31 and a plate member 33. Wires 41, 41 . . . , connecting lines 42, 43, 44 and the like are provided on the substrate 32 as in the embodiment described above. According to the modification, the light irradiation device 3 can be manufactured to be even thinner while the number of components required for its configuration is small, thereby reducing the cost. In place of the light reflection layer 31d of the reinforcement member 31 and the light reflection layer 33d of the plate member 33, it is also possible to separately provide a light reflection sheet in an arrangement similar to that of the light reflection layer 31d or the light reflection layer 33d.

Figure 11:
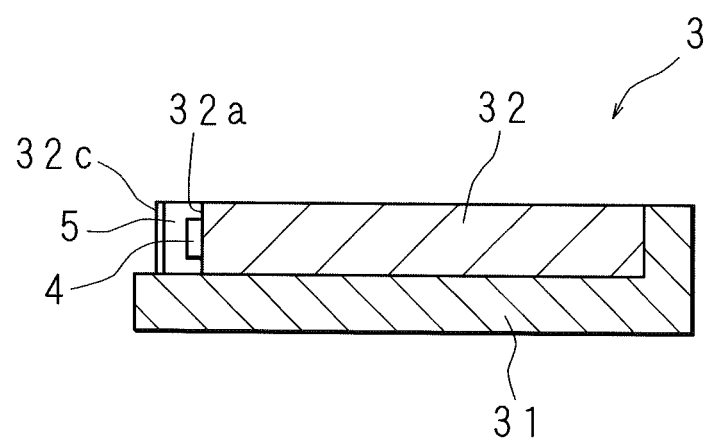
FIG. 11 is a schematic view illustrating a configuration of a light irradiation device according to another modification.

FIG. 11 is a schematic view illustrating a configuration of a light irradiation device 3 according to another modification. In this modification, the light irradiation device 3 is so configured that light emitting elements 4, 4 . . . are arranged on one end face 32a of a substrate 32, a sealing material 5 is used to seal the light emitting elements 4, 4 . . . , and a reinforcement plate 31 is bonded to the substrate 32, while not using a plate member 33. Wires 41, 41 . . . , connecting lines 42, 43, 44 and the like are provided on the substrate 32 as in the embodiment described above. According to the modification, the light irradiation device 3 is made thinner as the plate member 33 is not provided, and the number of components required for its configuration is reduced, thereby reducing the cost. In place of the light reflection layer 33d of the plate member 33, it is also possible to separately provide a light reflection sheet in an arrangement similar to that of the light reflection layer 33d.

Figure 12:
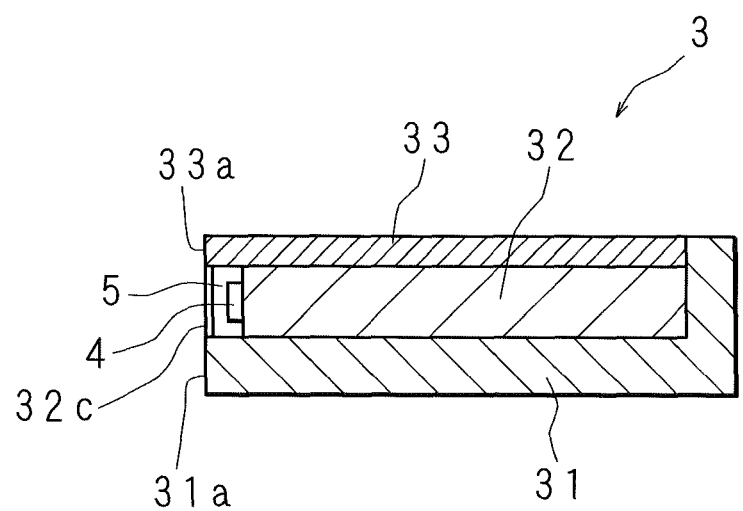
FIG. 12 is a schematic view illustrating a configuration of a light irradiation device according to another modification.

FIG. 12 is a schematic view illustrating a configuration of a light irradiation device 3 according to another modification. In the modification, the light irradiation device 3 is configured as similar to the embodiment described above, while the tip end faces of convex parts 32, 32 of the substrate 32, one end face 31a of the reinforcement plate 31 and one end face 33a of the plate member 33 are formed to be flush with one another. A sealing material 5 fills to a midway part of each of the convex parts 32c, 32c. In this modification, the reinforcement member 31 and the plate member 33 do not protrude from the convex parts 32c, 32c of the substrate 32. This modification is effective in the case where an end of the light guide plate 6 or the like cannot be sandwiched between the reinforcement plate 31 and the plate member 33 when assembled, as in the embodiment described above.

Figure 13:
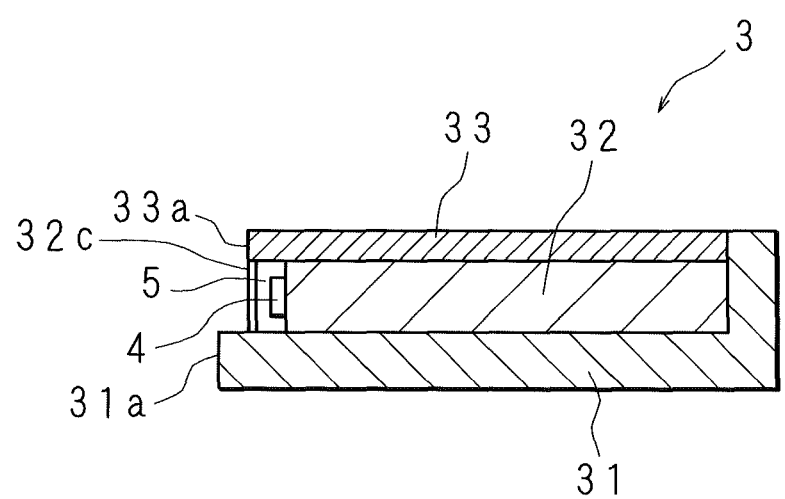
FIG. 13 is a schematic view illustrating a configuration of a light irradiation device according to another modification.

FIG. 13 is a schematic view illustrating a configuration of a light irradiation device 3 according to another modification. In this modification, the light irradiation device 3 is configured similarly to the embodiment described above, while one end face 33a of the plate member 33 is closer to the side of light emitting elements 4, 4 . . . than one end face 31a of the reinforcement plate 31, and is made flush with convex parts 32c, 32c of the substrate 32. This facilitates the light guide plate 6 to be located along the protruding portion of the reinforcement plate 31 and also facilitates alignment of the light guide plate 6 and the light irradiation device 3.

Though the convex parts 32c, 32c are located on both ends at the one end face 32a of the substrate 32 in the embodiment and modifications described above, the present invention is not limited thereto but a convex part may be located at, for example, a middle part or the like in the longitudinal direction of the one end face 32a. It is also possible not to provide the convex parts 32c, 32c. In the case where no convex parts 32c, 32c are provided, a mechanism for avoiding collision between the light guide plate 6 or the like and the sealing material 5 may preferably be provided in the device.

As the embodiments described herein are mere illustrations of the present invention, the present invention may be implemented in a variety of modified forms within the description of the appended claims and the scope defined based on the description of the claims.

The invention claimed is:

1. A light irradiation device emitting light, comprising:
a substrate formed in a rectangular shape;
a plurality of light emitting elements arranged on one end face of the substrate; and
a translucent sealing material adhered to the one end face to seal the plurality of light emitting elements,
wherein the one end face of the substrate is formed parallel to a direction of a thickness of the substrate, and
wherein the thickness of the substrate corresponding to a width of the one end face is less than 1 mm.

2. The light irradiation device according to claim 1, wherein a connecting line for carrying electric current to the plurality of light emitting elements is sealed with the sealing material.

3. The light irradiation device according to claim 1, further comprising
a reinforcement plate bonded to one surface of the substrate and protruding from the one end face,
wherein the sealing material is adhered to a portion protruding from the one end face of the reinforcement plate.

4. The light irradiation device according to claim 3,
wherein the reinforcement plate is provided with a light reflection layer at the portion protruding from the one end face.

5. The light irradiation device according to claim 3, further comprising
a plate member bonded to another surface of the substrate and protruding from the one end face,
wherein the sealing material is adhered to a portion protruding from the one end face of the plate member.

6. The light irradiation device according to claim 1, wherein the substrate is provided with a connecting terminal for connection to the plurality of light emitting elements on the one end face.

7. The light irradiation device according to claim 1, wherein the substrate is made by using aluminum or aluminum alloy.

8. The light irradiation device according to claim 4, wherein the reinforcement plate is made by using stainless steel.

9. A backlight device, comprising:
the light irradiation device according to claim 1; and
a light guide plate formed in a rectangular shape, having one end face opposed to the one end face of the light irradiation device, and outputting light entering the one end face of the light guide plate from one main surface.

10. A display apparatus, comprising:
the backlight device according to claim 9; and
a display panel on which an image is displayed,
wherein the one main surface of the light guide plate is arranged to be opposed to an opposite face of an image-displaying surface of the display panel.

11. A light irradiation device emitting light, comprising:
a substrate formed in a rectangular shape;
a plurality of light emitting elements arranged on one end face of the substrate;
a translucent sealing material adhered to the one end face to seal the plurality of light emitting elements; and
a reinforcement plate bonded to one surface of the substrate and protruding from the one end face,
wherein the sealing material is adhered to a portion protruding from the one end face of the reinforcement plate, and
wherein the reinforcement plate is bent at a side of another end face of the substrate.

12. A light irradiation device emitting light, comprising:
a substrate formed in a rectangular shape;
a plurality of light emitting elements arranged on one end face of the substrate; and
a translucent sealing material adhered to the one end face to seal the plurality of light emitting elements,
wherein the substrate includes a convex part projecting from the one end face at each of both ends of the one end face, and
the sealing material is placed to a midway part of the convex part.

\* \* \* \* \*